(12) United States Patent
Bantz et al.

(10) Patent No.: US 6,937,579 B2
(45) Date of Patent: Aug. 30, 2005

(54) ELECTRONIC DEVICE CONNECTION RESOURCE MANAGEMENT

(75) Inventors: David Fredrick Bantz, Bedford Hills, NY (US); Ponani S. Gopalakrishnan, New Delhi (IN); Daniel M. Gruen, Newton, MA (US); Lorraine M. Herger, Port Chester, NY (US); Nathan Junsup Lee, New City, NY (US); Dennis Gerard Shea, Ridgefield, CT (US); Marisa S. Viveros, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 10/627,823

(22) Filed: Jul. 25, 2003

(65) Prior Publication Data

US 2005/0018623 A1 Jan. 27, 2005

(51) Int. Cl.[7] ................................................ H04H 1/00
(52) U.S. Cl. ........................ 370/312; 370/390; 370/432
(58) Field of Search ................................ 370/312, 390, 370/432, 465, 473, 474

(56) References Cited

U.S. PATENT DOCUMENTS 4,802,220 A * 1/1989 Marker, Jr. ................... 380/33

2004/0219951 A1 * 11/2004 Holder ......................... 455/566

* cited by examiner

*Primary Examiner*—Melvin Marcelo
(74) *Attorney, Agent, or Firm*—Douglas W. Cameron; Ryan, Mason & Lewis, LLP (57) ABSTRACT

In a connection arrangement including two or more electronic devices, wherein information can be exchanged among the electronic devices through a plurality of communication links between the electronic devices, at least one of the electronic devices being configurable for communicating with a data source, a method for presenting a multi-channel message originating from the data source, the multi-channel message including a two or more components, includes the steps of allocating each of at least a portion of the components in the multi-channel message to at least one electronic device and, for each allocated component, determining possible communication paths between the data source and the at least one electronic device allocated to the corresponding component. The method further includes the steps of selecting, based at least in part on one or more selection criteria, at least one of the possible communication paths for the allocated components, each of the selected communication paths representing an optimal route between the data source and the at least one electronic device allocated to the corresponding component, and routing each of the allocated components in the multi-channel message according to the selected communication paths for presentation of the allocated components by the corresponding electronic device(s).

22 Claims, 4 Drawing Sheets

ELECTRONIC DEVICE CONNECTION RESOURCE MANAGEMENT

CROSS-REFERENCE TO RELATED APPLICATION

This application relates to commonly assigned U.S. application Ser. No. 10/442,218 entitled "Techniques for Providing a Virtual Workspace Comprised of a Multiplicity of Electronic Devices" filed on May 20, 2003, the disclosure of which is incorporated by reference herein.

FIELD OF THE INVENTION

The present invention relates generally to wireless communication systems, and more particularly relates to techniques for managing resources among a plurality of electronic devices in a wireless connection arrangement.

BACKGROUND OF THE INVENTION

Recent advancements in mobile computing technology, coupled with increasing demands for "transparent mobility" (i.e., mobility with a minimum amount of preplanning), have led to a proliferation of mobile computing devices and applications. Some of these devices, such as, for example, notebook computers, micro notebooks, etc., can be used for a variety of applications and may thus be considered general purpose devices. Because of the generality of these devices, however, they are not well-suited for immediate use for any dedicated application. Accordingly, classes of task-specific electronic devices, such as, for example, personal data assistants (PDAs), mobile cell phones, digital music players (e.g., MP3 devices), etc., have arisen. Each of these specialized devices is typically optimized for immediate use, although for a limited set of applications. Mobile users often own and regularly use both general purpose mobile computing devices and task-specific mobile devices. Many of these devices are capable of independent communication with other electronic devices, for example, using wide area networks (WANs), local area networks (LANs), short-range personal area networks (PANs), etc.

With few exceptions, today these mobile devices are designed for independent use. However, as PANs such as, for example, Bluetooth® (a registered trademark of Bluetooth SIG, Inc.) become more widespread, it is contemplated that mobile users may employ their electronic devices in a more coordinated fashion. For instance, a mobile user may watch a music video clip on his or her cell phone while listening to a streaming download of associated music on his or her digital music player. This style of communication is often referred to as "multi-channel" communication, since a single logical message (e.g., the music video) may include multiple media types delivered over multiple communication links to multiple end-user devices. Multi-channel communication is different from multimedia messaging (e.g., Motion Pictures Experts Group 4 (MPEG-4)) in that multimedia messaging generally standardizes messages carried on the same communication channel and delivered to a single device capable of reproducing at least one of its components, while multi-channel communication involves coordinating activity on multiple communication channels and/or devices simultaneously.

One of the disadvantages associated with a conventional multi-channel communication environment is that one or more of the communication links needed to access a given message may not be available. Moreover, message latency associated with each of the communication links, which can vary independently of one another at any given time, are typically not matched to one another. When two or more components of a multi-channel message experience different latencies, they will be presented to the user out of synchronism, which is perceptually undesirable.

There exists a need, therefore, in the field of mobile communication technology for an improved method of coordinating resources among a plurality of electronic devices and/or communication links, especially in a multi-channel communication environment.

SUMMARY OF THE INVENTION

The present invention provides techniques for providing connection resource management among two or more electronic devices and/or communication links in a wireless connection arrangement. The techniques of the invention substantially eliminate the need to manually choose at least how components of a multi-channel message are received, which communication links these components traverse from their respective source(s) to their respective destination(s), and how reconfiguration is to be performed when changes and/or failures in the configuration of the wireless communication system occur.

The invention disclosed herein implements methods for the automatic and dynamic evaluation and/or selection of communication paths for packets currently carrying multi-channel messages, typically received from multiple communications links and destined to multiple presentation sources on multiple electronic devices, for presenting these multi-channel messages.

In accordance with one embodiment of the invention, in a connection arrangement including two or more electronic devices, wherein information can be exchanged among the electronic devices through a plurality of communication links between the electronic devices, at least one of the electronic devices being configurable for communicating with a data source, a method for presenting a multi-channel message originating from the data source, the multi-channel message including a two or more components, includes the steps of allocating each of at least a portion of the components in the multi-channel message to at least one electronic device and, for each allocated component, determining possible communication paths between the data source and the at least one electronic device allocated to the corresponding component. The method further includes the steps of selecting, based at least in part on one or more selection criteria, at least one of the possible communication paths for the allocated components, each of the selected communication paths representing an optimal route between the data source and the at least one electronic device allocated to the corresponding component, and routing each of the allocated components in the multi-channel message according to the selected communication paths for presentation of the allocated components by the corresponding electronic device(s).

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of an illustrative electronic device connection arrangement including a plurality of electronic devices associated with a particular user or users. It should be appreciated, however, that the present invention is not limited to this or any particular connection arrangement. Rather, the invention is more generally applicable to techniques for optimally routing components of a multi-channel message among a plurality of electronic devices in a device connection arrangement.

Figure 1:
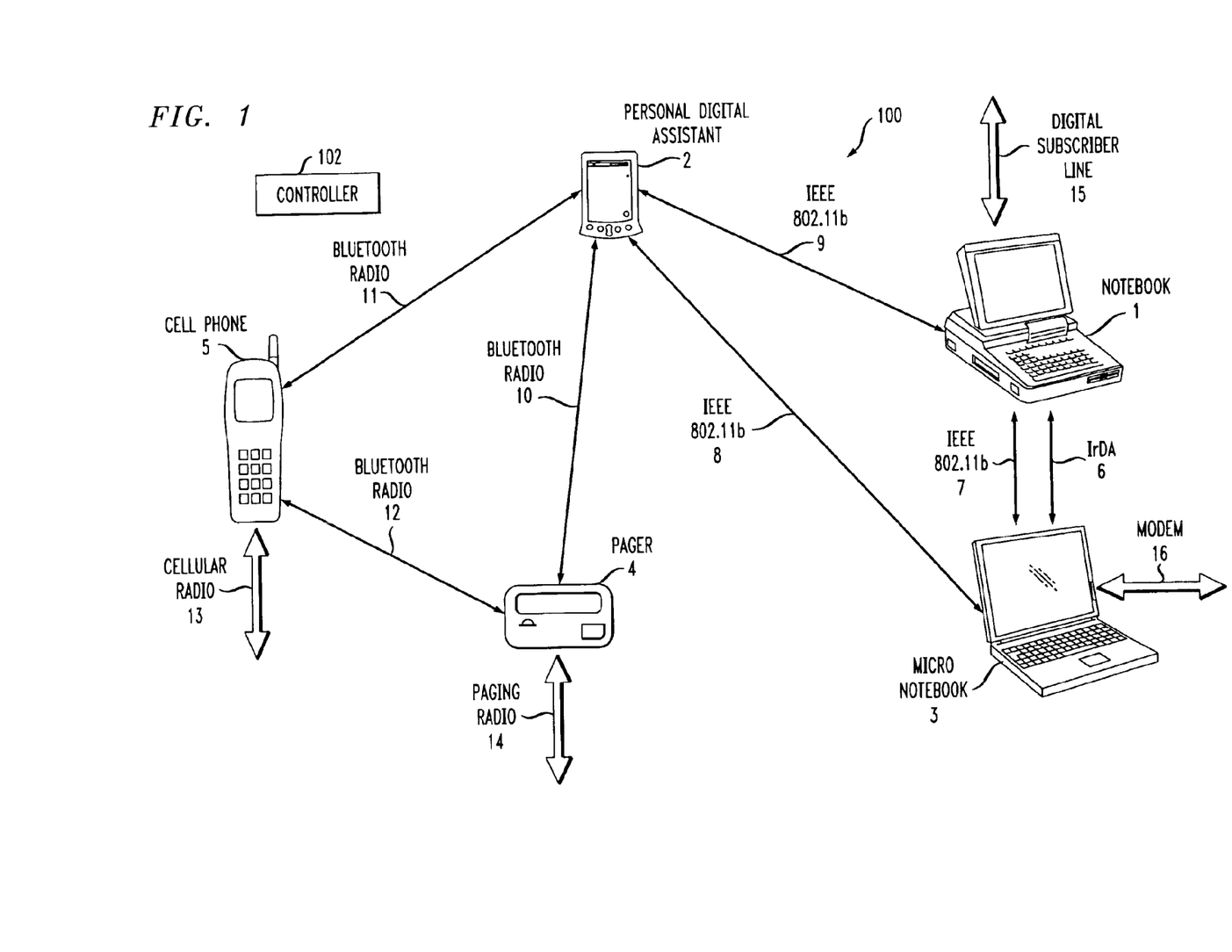
FIG. 1 is a block diagram illustrating an exemplary mobile communication system in which the methodologies of the present invention may be implemented.

FIG. 1 illustrates an exemplary device connection arrangement 100, which may be referred to herein as a personal workspace, in which the techniques of the present invention may be implemented. The connection arrangement 100 includes a plurality of electronic devices, such as, for example, a notebook computer 1, a personal digital assistant (PDA) 2, a micro notebook computer 3, a pager 4 and cellular phone 5. The electronic devices are preferably configured for portability (i.e., mobile devices), although the electronic devices are not required to be portable in order to benefit from the techniques of the present invention described herein. The set of electronic devices 1, 2, 3, 4, 5 may represent, for example, the devices typically utilized at a given location or by a given user. Information can be exchanged among the plurality of electronic devices 1, 2, 3, 4 and 5 in a variety of ways, only some of which are depicted in the figure and described herein.

By way of example only, information may be exchanged between notebook computer 1 and micro notebook computer 3 via an infrared link 6 (e.g., infrared data association (IrDA) link). Alternatively, information may be exchanged between notebook computer 1 and micro notebook computer 3, between micro notebook computer 3 and PDA 2, and between PDA 2 and notebook computer 1, via a wireless local area network (WLAN) link 7, 8 and 9, respectively, using, for example, a standard communication protocol such as an Institute of Electrical and Electronics Engineers (IEEE) 802.11b standard. Alternative standard WLAN communication protocols (e.g., IEEE 802.11a, IEEE 802.11g, etc.), as well as nonstandard communication protocols, may also be employed by the present invention, as will be understood by those skilled in the art. Likewise, information may be exchanged between PDA 2 and pager 4, between PDA 2 and cell phone 5, and between cell phone 5 and pager 4, via a Bluetooth® radio link 10, 11 and 12, respectively.

The exemplary connection arrangement 100 may comprise a plurality of WAN communication links 13, 14, 15 and 16, as apparent from the figure. These communication links 13, 14, 15, 16 are preferably configurable for carrying data bidirectionally, for example, between a data source, which may comprise the Internet (not shown), via an Internet service provider (ISP) or alternative gateway, and a corresponding electronic device 5, 4, 1, 3, respectively. Communication link 13 may comprise, for example, a cellular radio link, communication link 14 may comprise, for example, a paging radio link, communication link 15 may comprise, for example, a digital subscriber line (DSL) link, and communication link 16 may comprise, for example, a modem link. The term "communication link" as used herein is intended to refer to a wireless communication channel, such as, but not limited to, radio frequency (RF), infrared (IR), microwave, etc., or a wired communication channel, such as, but not limited to, telephone, cable, etc., although alternative communication media may be used.

Messages between the Internet and the various electronic devices in the exemplary connection arrangement 100 can be carried in a variety of ways, as will be understood by those skilled in the art. For example, a message comprising text information can be transmitted from the Internet over paging radio link 14 and received by pager 4, relayed to PDA 2 via Bluetooth® radio link 10, and subsequently relayed to notebook computer 1 via IEEE 802.11b WLAN link 9. This is asserted to be an optimal communication route between pager 4 and notebook computer 1, since any other communication route traverses more links and includes additional electronic devices each serving as a relay point, thus adding latency and increasing the overall power consumption in the overall connection arrangement 100.

It is to be appreciated that one or more of the communication links and/or relay points (devices) comprising a given path may be deemed unreliable, and therefore a preferred communication path may not necessarily be the shortest path. For example, Bluetooth® radio link 10 may have been found to be unreliable, and in this instance a better path may include Bluetooth® radio links 11 and 12 instead of link 10. In this path, cell phone 5 serves as an additional relay point.

By way of example only, an application of the exemplary connection arrangement 100 will now be described, in accordance with one aspect of the present invention. Consider a multi-channel message comprising a video component and an audio component, with both components originating from the Internet. Also, assume that it has been determined (e.g., using the methodologies set forth in the related application entitled "Techniques for Providing a Virtual Workspace Comprised of a Multiplicity of Electronic Devices") that an optimal allocation of multi-channel message components among the electronic devices is for the video component of the message to be presented on PDA 2 and the audio component to be presented on cell phone 5.

An optimal routing for the video component, assuming all devices and links are reliable, is from the Internet via DSL link 15 to notebook computer 1, and subsequently to PDA 2 via IEEE 802.11b WLAN link 9. The audio component of the message could also traverse this same path, and then be relayed by PDA 2 to cell phone 5 via Bluetooth® radio link 11. However, this would add an additional delay between the video and audio components resulting, at least in part, from the added latency associated with the relaying process, between PDA 2 and cell phone 5, and the communication link 11. Rather, an optimal routing for the audio component of the message may be from the Internet via cellular radio link 13, directly to cell phone 5. The actual latency difference between this path and an alternate communication path is preferably evaluated and a path is preferably chosen for the audio component having a latency that is substantially matched to the latency associated with the video component. In this manner, presentation of the audio and video components of the multi-channel message can be advantageously synchronized with respect to one another.

In order to more clearly describe the methodologies of the invention, links to the Internet are denoted as $L_{ik}$, where i is the number of an electronic device and k enumerates all of the links between the Internet and the electronic device. For example, DSL link 15 may be denoted as $L_{11}$, the first (and only) link between notebook computer 1 and the Internet. Moreover, links between electronic devices can be denoted as $M_{ijk}$, where i is the number of a first electronic device, j is the number of a second electronic device, and k enumerates all of the links between the two devices. For example, the IEEE 802.11b WLAN link 8 between the PDA 2 and the micro notebook computer 3 may be denoted as $M_{231}$, the first (and only) link between the two devices. Arbitrarily, we may denote the IrDA link 6 between notebook computer 1 and micro notebook computer 3 as $M_{132}$, the second link between the two devices. The values $L_{ik}$ and $M_{ijk}$ may be assigned as attributes of a given link. Other attributes may also be assigned to a link including, for example, latency, bandwidth, cost, record of reliability, etc.

An enumeration of all paths between the Internet and a given electronic device p in the exemplary connection arrangement 100 can be formed as the following sequence:

$$L_{ia}M_{abc}M_{bde} \ldots M_{dpf}$$

In the case where only one link exists between each pair of devices, the following simpler sequence can be formed:

$$L_{ia}M_{ab1}M_{bc1} \ldots M_{cp1}$$

In either case, no circular paths are allowed. This requires that for a given sequence of $M_{ijk}$, the actual values of i and j do not appear more than twice. Paths that contain other paths as a subset are also eliminated from further consideration.

In the general case comprising an arbitrary number of electronic devices, the enumeration of all paths can be time-consuming and storage-intensive. However, in practice the number of electronic devices in a given personal workspace is typically small (e.g., less than about 10), and the number of possible communication links is typically small as well (e.g., less than about 20). In the exemplary connection arrangement 100, for example, there are 15 possible communication paths between the Internet and pager 4. Specifically, there are six paths involving $L_{11}$, six paths involving $L_{31}$, two paths involving $L_{51}$, and one path involving $L_{41}$. One of the six paths involving $L_{11}$, for instance, is $L_{11}M_{132}M_{321}M_{251}M_{541}$. It is likely that, at least from a latency perspective, this path is inferior to another one of the six paths involving $L_{11}$, namely, the path $L_{11}M_{121}M_{241}$.

Figure 2:
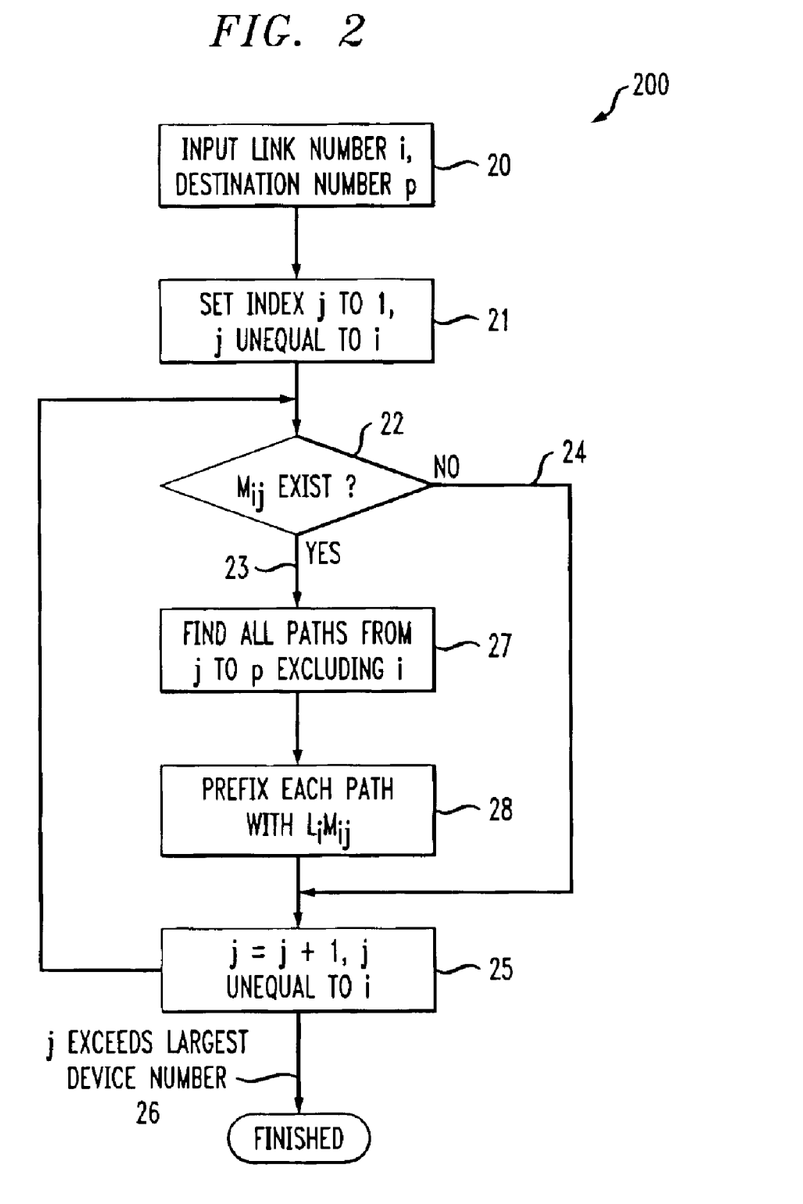
FIG. 2 is a process flow diagram illustrating an exemplary communication path enumeration methodology, in accordance with one embodiment of the invention.
Figure 3:
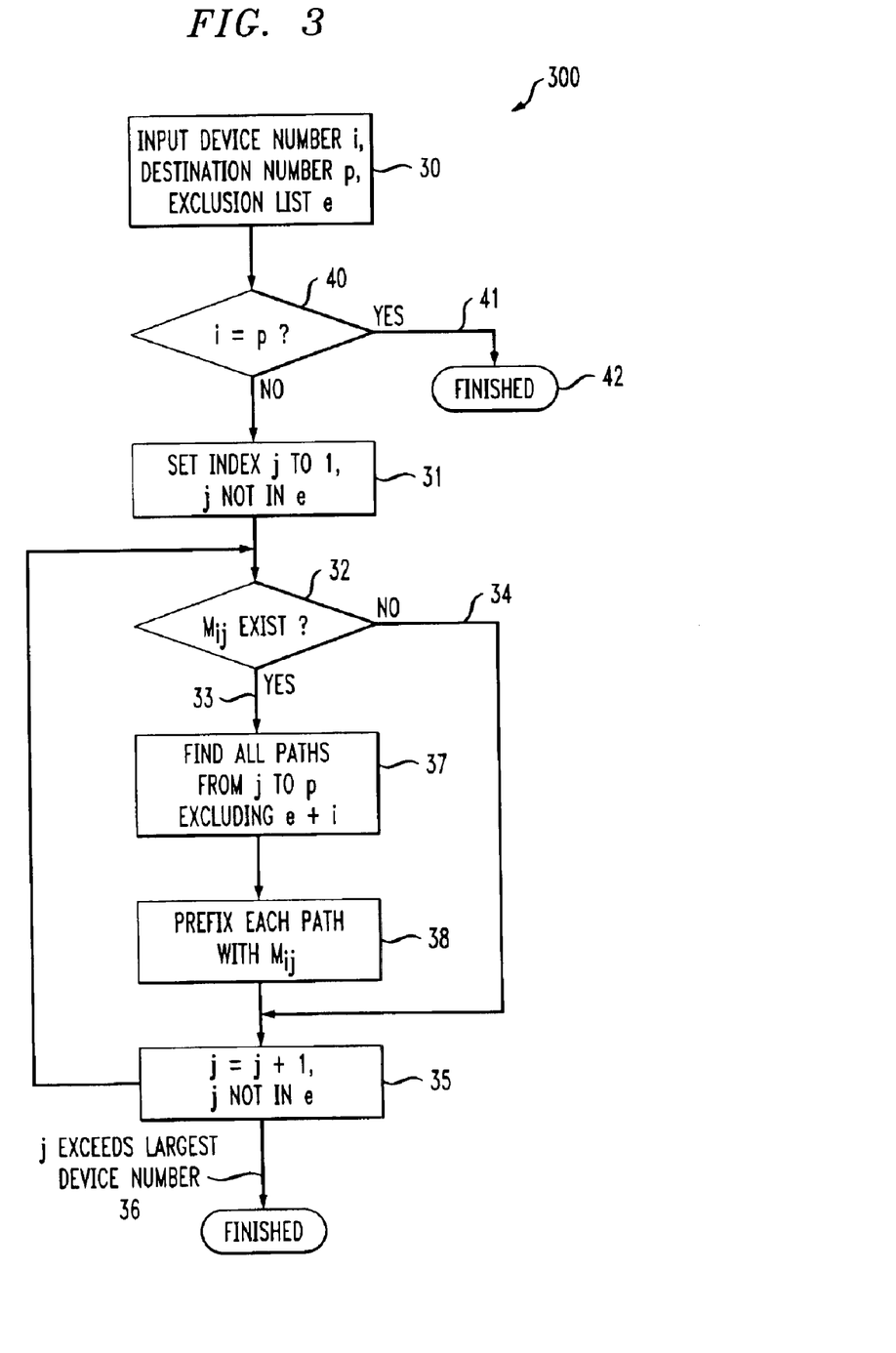
FIG. 3 is a process flow diagram illustrating an exemplary methodology for enumerating communication paths between electronic devices, in accordance with one embodiment of the invention.

FIGS. 2 and 3 illustrate exemplary methodologies for determining all possible communication paths in an arbitrary personal workspace, given a communication link selection and a selection of a destination electronic device p, in accordance with one embodiment of the invention. Specifically, FIG. 2 is a process flow diagram illustrating an exemplary path enumeration methodology 200 of the invention. It is to be appreciated that alternative methodologies for determining the possible communication paths in the personal workspace are similarly contemplated by the invention. For ease of explanation with regard to FIGS. 2 and 3, assume that only one communication path exists between any two electronic devices, and between the Internet and any electronic device. A generalization based on this assumption will be readily understood by those skilled in the art. Using this simpler case, the representations $L_{ij}$ and $M_{ijk}$ defined above may be replaced by the abbreviated representations $L_i$ and $M_{ij}$, since the value of k will always be one.

With reference to FIG. 2, given an input communication link number i and a number of the destination electronic device p, the exemplary path enumeration methodology 200 determines all paths from the given link to the destination electronic device. In block 20, the link number i and destination electronic device number p are input. The exemplary methodology 200 continues at block 21, which initializes an index j, where j is a positive integer, such as by initially setting j equal to 1 but not equal to the input link number i. When the input link number i is 1, then j is preferably initialized to 2. Block 22 determines whether a communication path $M_{ij}$ exists directly between electronic device i, the device to which the input link is connected, and electronic device j. When no path $M_{ij}$ between devices i and j is found, process flow branch 24 is taken to block 25, where index j is incremented by one, subject to the constraint that j is unequal to i. When j exceeds the largest electronic device number after incrementing, the exemplary path enumeration methodology 200 is complete. When index j does not exceed the largest electronic device number in the connection arrangement, process flow control returns to block 22.

When a path $M_{ij}$ is found directly between electronic device i and electronic device j, process flow branch 23 is taken to block 27. Block 27 determines all communication paths from device j to the destination device p, excluding device i. An exemplary methodology 300 for determining the communication paths between two electronic devices is illustrated in FIG. 3, in accordance with one embodiment of the invention. The exclusion of device i is necessary in order to preclude loops in the paths. After all paths are found, process control proceeds to block 28, wherein a prefix $L_iM_{ij}$ is added to each of the communication paths determined in block 27. Block 28 additionally generates an output list comprising all of the paths. After all paths have been appropriately prefixed and added to the output list, process control continues to block 25, where the index j is incremented and evaluated, as previously explained.

Referring now to FIG. 3, the exemplary path determination methodology 300 will be described. The methodology 300, which may be implemented in block 27 of the exemplary path enumeration methodology 200 shown in FIG. 2, is similar to methodology 200, except that methodology 300 is essentially concerned only with finding communication paths between electronic devices. The exemplary path determination methodology 300 begins at block 30, wherein an initialization procedure is performed. The initialization procedure may include receiving a starting electronic device number i and a destination electronic device number p as input. Any output paths will start from device i and end with device p. Additionally, an exclusion list, e, is received by block 30 as input. No electronic device numbers on the exclusion list will be included in the paths generated by the path determination methodology 300. The exemplary methodology 200 of FIG. 2 preferably uses the methodology 300 of FIG. 3 with an exclusion list comprising a single number.

After performing the initialization procedure in block 30, the methodology 300 continues to block 40, which determines whether or not the input device i and destination device p are the same. When i is equal to p, process control branch 41 is taken and the exemplary path determination methodology 300 is complete. Process control may then return to the calling procedure, which may reside in block 27 of the exemplary methodology 200 of FIG. 2, as previously stated. When i is not equal to p, block 31 is entered, which initializes an index j so as to be either 1 or the smallest device number not in the exclusion list e. After initializing the index j, process control continues to block 32, which determines whether a communication path exists directly between electronic devices i and j. When no path is found, process control branch 34 is taken to block 35, which increments index j by one subject to the constraint that j is not in the exclusion list e and j is not larger than the largest electronic device number in the connection arrangement. When, upon incrementing index j, it is determined that j exceeds the largest electronic device number, control process branch 36 is taken and the exemplary path determination methodology 300 is deemed complete. At this point, process control may return to block 27 in FIG. 2. While j does not exceed the largest electronic device number, block 32 is entered again.

When block 32 determines that a communication path does exist directly between devices i and j, control process branch 33 is taken and the methodology 300 continues by entering block 37. Block 37 determines all paths from device j to device p excluding device i, again subject to the constraint that j is not in the exclusion list e, to which device i is added. Note, that the exemplary path determination methodology 300 depicted in FIG. 3 describes a general path determination process. Therefore, block 37 can be thought of as a recursive invocation of the path determination methodology 300. Once all communication paths have been found from device j to device p, the process continues at block 38, wherein a prefix $M_{ij}$ is added to each path determined in block 37. After all prefixes have been appropriately added, block 35 entered and process control continues as previously described.

Figure 4:
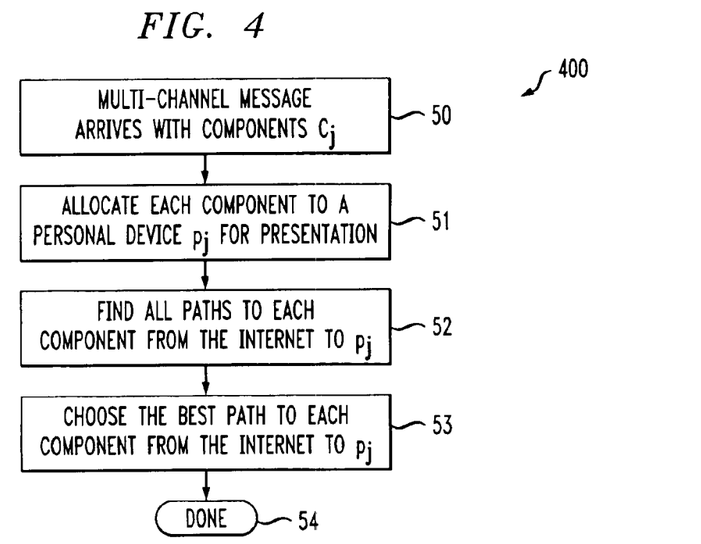
FIG. 4 is a process flow diagram illustrating an exemplary overall routing methodology, in accordance with one embodiment of the invention.

FIG. 4 illustrates an exemplary overall routing decision methodology 400 according to one embodiment of the present invention. As apparent from the figure, the exemplary routing decision methodology 400 is initiated when, in block 50, a multi-channel message arrives or notification of the availability of the multi-channel message is received. Individual components, $C_j$, where j is an integer representing the component number, comprised in the multi-channel message are preferably identified in the notification. Process flow then continues to block 51, wherein each component $C_j$ of the received multi-channel message is operatively allocated to a particular electronic device (or devices) $p_j$. The allocation step is preferably performed in an automated fashion and may be based, at least in part, on one or more characteristics of the electronic device itself (e.g., memory size, display resolution, etc.), one or more characteristics of the communication links (e.g., speed, bandwidth, etc.), user preferences, etc., although alternative techniques for allocating the components of the multi-channel message are contemplated by the present invention.

The process of allocating the components $C_j$ of the multi-channel message to the appropriate electronic devices $p_j$ may be performed once, for instance, upon receiving the multi-channel message. However, in a preferred embodiment of the invention, the allocation procedure may be performed periodically (e.g., once per minute) to determine whether or not the condition(s) upon which the allocation decision was initially based are still valid, and to dynamically update the allocation resources when conditions in the connection arrangement have changed. In this manner, if an electronic device to which a particular component of the multi-channel message has been assigned fails or is otherwise unreliable, a new electronic device may be substituted therefor. Also, as devices are added or removed from the connection arrangement (e.g., as a user's mobile communication network is expanded or contracted), allocation of the components of the multi-channel message can be dynamically changed accordingly. The methodologies described in related application entitled "Techniques for Providing a Virtual Workspace Comprised of a Multiplicity of Electronic Devices," noted above, may be utilized for locating one or more electronic devices $p_j$ for the presentation of components $C_j$ in the multi-channel message.

After each of the components $C_j$ in the received multi-channel message has been allocated in block 51 to a corresponding electronic device $p_j$ for presentation to a user, block 52 is entered. In block 52, for each component $C_j$ of the multi-channel message, all communication paths between the Internet (or alternative data source) and the electronic device $p_j$ corresponding to the component $C_j$ are located. Block 52 preferably utilizes the exemplary methodologies 200, 300 described above in conjunction with FIGS. 2 and 3, respectively, although alternative path enumeration and evaluation techniques are contemplated by the present invention. Once block 52 has completed, process control continues at block 53, wherein an optimal communication path for each component is operatively selected. When block 53 has completed its procedure, the exemplary routing decision methodology 400 is terminated at block 54.

Figure 5:
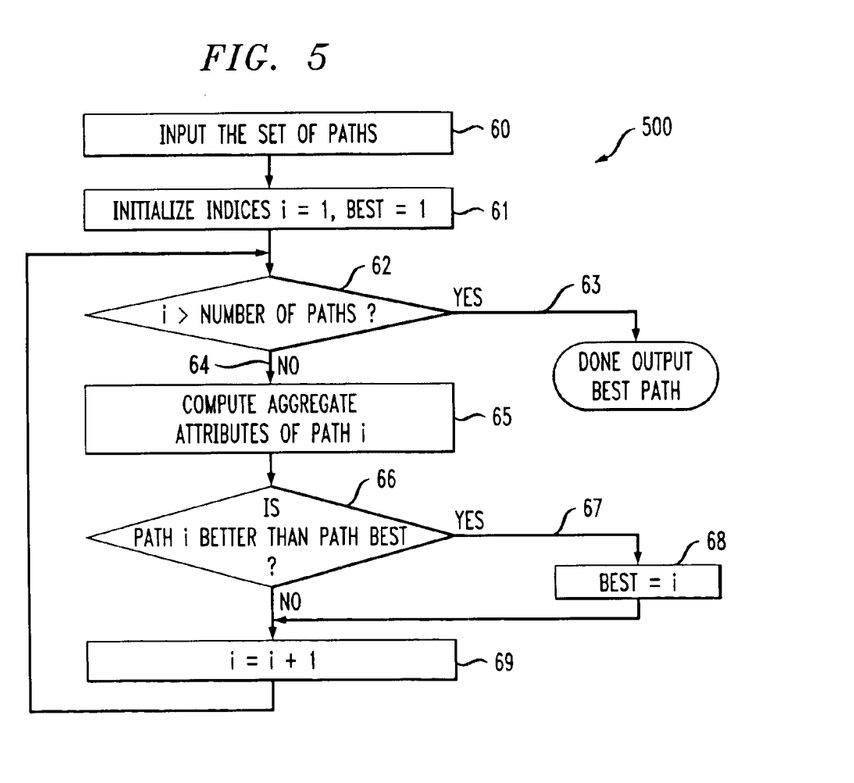
FIG. 5 is a process flow diagram illustrating an exemplary methodology for selecting an optimal routing path, in accordance with one embodiment of the invention.

FIG. 5 depicts an exemplary path selection methodology 500 for selecting an optimal communication path for each component in the received multi-channel message. This exemplary path selection methodology 500 is preferably utilized in block 53 in the exemplary routing decision methodology 400 shown in FIG. 4, although alternative path selection techniques may be similarly employed. As apparent from the figure, the path selection methodology 500 begins at block 60, which receives as input a plurality of communication paths to be compared, together with a policy for path comparison. The policy which is input to block 60 defines a set of criteria (i.e., rules) with which to evaluate and compare the individual communication paths. For example, in a preferred embodiment of the invention, the policy may comprise one or more path characteristics, such as, but not limited to, latency, bandwidth, reliability, etc., which can be used for determining an optimal path.

Once the set of communication paths and policy has been input at block 60, the path selection methodology 500 continues to block 61, wherein an initialization procedure is performed. Block 61 preferably initializes at least two indices, namely, an index i, where i corresponds to a current communication path being evaluated, and an index variable best which retains the index number i of the best path found so far. The phrase "best path" as used herein preferably refers to the communication path that more closely matches the selection criteria associated with the policy. Once initialization has been performed, block 62 is entered. Block 62 determines whether or not the index i exceeds the number of paths input to block 60. When the index i exceeds the number of paths, control process branch 63 is taken and the path selection methodology 500 is completed. Process control may then be returned to the calling routine, which may be block 53 in the exemplary decision methodology 400 shown in FIG. 4.

When the index i evaluated in block 62 has not exceeded the number of communication paths input to block 60, process control continues at block 65 via control process branch 64. Block 65 computes what may be referred to as aggregate attributes of a communication path. Specifically, each link in a given path is preferably characterized by a set of attributes. These attributes can be stored, at least temporarily, in some electronic computing device or determined at the time a path is to be determined. Typically, one or more electronic computing devices on which the link terminates maintain attributes corresponding to the link. The attributes may be, for example, an estimate of the link latency, a distribution of link latencies, an estimate of the bandwidth of the link, the number of dropped packets on the link as a proportion of the number of packets sent, or various other attributes that may be helpful in characterizing the link. One attribute of some importance is the power necessary to send a packet of a given length on the link.

Block 65 preferably uses the attributes of the links comprising a given communication path i to compute a single set of aggregate attributes for the path. The methodology used for computing the set of aggregate attributes may depend upon the type of attribute. For example, if the attribute is power, the aggregate attribute may be computed as a sum of the powers expended on the constituent links comprising the path i. Likewise, if the attribute is bandwidth, the aggregate attribute may be computed as a minimum of the bandwidths available on the constituent links. Moreover, if the attribute is latency, the aggregate attribute may be computed as a sum of the respective latencies on the constituent links, unless the latency is known as distributions of a common type. In such case, the aggregate latency can be estimated as a square root of the sum of the squares of the average latency on each constituent link. Techniques for computing the aggregate attributes will be known by those skilled in the art.

After computing the aggregate attributes corresponding to a path i, the exemplary path selection methodology 500 continues at block 66. Block 66 determines whether one path is better than another. This can be accomplished by comparing the aggregate attributes of two communication paths, in accordance with the criteria set forth in the policy. The policy may be represented using a standard information model, such as, for example, the Internet Engineering Task Force (IETF) RFCs 3060 entitled "Policy Core Information Model—Version 1" (February 2001), and extensions thereto, including IETF RFC 3460 entitled "Policy Core Information Model (PCIM) Extensions" (proposed January 2003), which are incorporated herein by reference. By way of example only, the user may have a priori set a policy that requires best fidelity of reproduction. In this instance, the attributes of the two paths to be compared may include characteristics such as, for example, latency, latency variability, dropped packets, and/or bandwidth. In the case where the user has set a policy requiring minimization of power, the attributes of the two paths to be compared may comprise, for example, an estimate of the total power per packet required to communicate over the two paths.

When block 66 determines that the communication path currently under consideration is better than the path whose index is currently stored in the index variable best, process control branch 67 is taken to block 68, wherein the index variable best is set to the index of the current path and the index i is incremented by one in block 69. When block 66 determines that the path currently under consideration is not better in comparison to the path whose index is stored in index variable best, the index variable best is left unchanged and the procedure continues to block 69, which increments index i by one to evaluate the next path. Process control then continues at block 62 which checks to determine whether index i has exceeded the number of paths input to block 60, as previously explained. This methodology continues until the index i exceeds the number of paths input at block 60. When the methodology has completed, the number of the optimal communication path will be stored in index variable best.

It may be the case that the criteria (i.e., policy) for selection of a path is not necessarily whether some aggregate attribute is better than the aggregate attributes of all other paths, but rather whether an aggregate attribute is equal to that of another path. An important example of this scenario is when it is desired to substantially match the latencies of two or more paths. For example, as previously stated, in a multi-channel communication environment which involves coordinating activity on multiple communication paths simultaneously, it is beneficial that the latencies of each of the paths are substantially matched to one another so as to ensure proper synchronization among the various electronic devices used to present the respective components. In this case, it is not necessary that the latency of a given path be minimal.

Thus, in accordance with a preferred embodiment of the invention, the exemplary overall routing decision methodology 400 of FIG. 4 can be modified. For each component of the multi-channel message, a set of feasible communication paths is preferably determined, rather than just one path. A final path selection methodology then involves a comparison of the members of respective sets of feasible paths corresponding to each of the components. For example, a first component may have a set associated therewith comprising feasible paths $p_1$ with latency $l_1$ $p_2$ with latency $l_2$, and $p_3$ with latency $l_3$, while a second component may have a set associated therewith comprising feasible paths $p_4$ with latency $l_4$, $p_5$ with latency $l_5$, and $p_6$ with latency $l_6$. It may be the case that $l_2$ is substantially equal to $l_6$, and $l_1$ is substantially equal to $l_4$, both $l_1$ and $l_4$ being less than $l_2$. In this case, path $p_1$ is preferably selected for the first component and path $p_4$ is preferably selected for the second component. Techniques for implementing this comparison will be readily understood by those skilled in the art. Consequently, a detailed description of this implementation will not be presented herein.

In accordance with another aspect of the present invention, there are several optimizations that can be utilized with the methodologies described above in connection with FIGS. 2 and 3 relating to path attributes. For instance, when it is known that the user policy for path selection is to maximize fidelity and when a particular component of a multi-channel message requires a bandwidth of B in order to reproduce the component with a desired fidelity, during the path enumeration and selection methodologies 200, 300 previously described (see FIGS. 2 and 3), when any link is encountered whose bandwidth is less than B, this communication path is immediately rejected. This can significantly reduce the number of communication paths to be compared (e.g., in block 53 of FIG. 4) and thereby speed the overall routing decision methodology.

Hints can be used as well as policies to reduce the number of communication paths to be compared. By way of example only, when a particular electronic device, e.g., pager 4 (see FIG. 1), is known to have a low battery capacity, then any path traversing that device should be eliminated from consideration during the path enumeration and selection methodologies 200, 300 (see FIGS. 2 and 3). When there are multiple links between two electronic devices (e.g., links 6 and 7 between devices 1 and 3 in FIG. 1), the path evaluation and selection methodologies may also be simplified when it is known that all of the attributes associated with one link are superior to the attributes associated with the other link(s). For example, consider a serial cable link and high-speed infrared link. Assuming the infrared link is superior to the cable link in substantially every respect, the cable link can be eliminated from inclusion in any communication path evaluation.

For the successive receipt of multi-channel messages using the same device configuration, when the multi-channel messages have substantially the same components, the same communication paths may be employed. Optionally, the exemplary electronic device arrangement may be configurable for maintaining a history of device allocations and/or communication paths corresponding to a given set of message components. In this manner, when the configuration for the receipt of a new multi-channel message matches a past configuration and the components of the multi-channel message are the same as a previously received message, an optimal communication path/electronic device allocation can be selected from the history list rather than by using the methodologies previously described, thereby significantly speeding the overall routing decision methodology.

During normal operation of the exemplary device connection arrangement 100 shown in FIG. 1, one or more links and/or electronic devices may fail or otherwise be removed from the connection arrangement. Moreover, new device may become active in the connection arrangement, for example, when a user powers on a particular device having wireless connectivity to other devices and/or the Internet. A given collection of communication routes for each of the components of a multi-channel message may or may not be affected by such a spontaneous configuration change. For instance, in the case of the failure or removal of a device, a given route may become unavailable. Likewise, in the case of a new device, a more optimal route may become available.

In accordance with one embodiment of the invention, considering the first case, namely, where there is a failure or removal of a device and/or link from the connection arrangement, the connection arrangement preferably first determines whether any route(s) currently involved in the communication of a multi-channel message has been affected, and, if so, provide an alternative route for that component of the message. This may be facilitated by retention of the information (e.g., stored in a table in memory) derived during the path enumeration and characterization methodologies previously described in conjunction with FIG. 2.

Some of the communication paths determined as a result of the path enumeration and characterization methodologies may already be used for conveying other components of the multi-channel message. Furthermore, one or more paths are assumed to be no longer available as a result of the failure or removal of a device. Among the paths still available, the path selection methodology depicted in block 53 shown in FIG. 4 (and further described in conjunction with FIG. 5) is preferably repeated so as to select a best alternative communication path. An important difference here is that the initialization procedure performed in block 60 of FIG. 5, which receives as input the set of paths, need only consider those paths which are now available, rather than the entire set of paths available during set-up time.

Considering the second case, namely, where a device and/or communication link is added to the connection arrangement, the connection arrangement preferably first determines whether the currently selected set of communication paths is functioning adequately. It may be that the original path allocation methodology of FIG. 5 still meets all of the criteria for the conveyance of the multi-channel message. If so, no changes need be made to the connection arrangement. In some instances, however, the addition of the new device and/or communication link provides a more optimal route than a currently selected route. In such case, the exemplary path selection methodology of FIG. 5 may be repeated with the addition of the new communication paths made available by the addition of the new device and/or link. In this manner, the exemplary device allocation and path selection methodology can be dynamically changed to take advantage of the new communication paths. It is to be appreciated that the exemplary path selection methodology shown in FIG. 5 can be facilitated by retaining (e.g., in memory) the information derived during the path enumeration and characterization methodologies of FIG. 2, as previously stated.

In accordance with a preferred embodiment of the invention, a database is employed for retaining at least a portion of the information derived from the exemplary path enumeration methodology shown in FIG. 2. Preferably, each allocated communication path whose aggregate attributes do not satisfactorily meet the criteria for the conveyance of the multi-channel message component to which it is allocated is marked. Then, when performing the exemplary path selection methodology shown in FIG. 5, only marked communication paths need be considered when new paths become available.

In accordance with another aspect of the invention, the routing decision methodology of the present invention may be implemented, in whole or in part, in a circuit (not shown). The circuit may include a controller 102, as shown in FIG. 1, that is configurable for performing at least a portion of the methodologies of the invention described herein. Controller 102 may be implemented as a stand-alone apparatus external to the electronic devices 1 through 5 in the connection arrangement 100 (as shown in FIG. 1) and operatively coupled to one or more of the devices. Alternatively, controller 102 can be a part of one, more, or all of the devices 1 through 5.

The term controller as used herein is intended to include any processing device, such as, for example, one that includes a central processing unit (CPU) and/or other processing circuitry (e.g., microprocessor). The controller and/or processing blocks can also be implemented as dedicated circuitry in hardware. Additionally, it is to be understood that the term "controller" may refer to more than one controller device, and that various elements associated with a controller device may be shared by other controller devices. Moreover, the circuit for performing the methodologies of the present invention as described herein may be implemented, at least in part, in a semiconductor device, which may comprise more than one such circuits, as will be understood by those skilled in the art.

It is to be understood that, in accordance with the present invention, the exemplary connection arrangement is preferably configured such that routing is performed in each of the electronic devices comprised in the connection arrangement. Alternatively, routing may be performed by a subset of one or more of the devices which, for example, routes data traffic to and from the Internet on behalf of all of the other devices in the connection arrangement. The decision-making as to which route(s) to select may be implemented in hardware, software, or a combination of hardware and software, associated with one or more of the electronic devices, or alternatively associated with a dedicated apparatus (e.g., a gateway to the Internet, router, etc.). But since the links between electronic devices are often point-to-point (e.g., infrared), the actual routing is preferably performed in each device, as previously stated.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. In a connection arrangement including a plurality of electronic devices, wherein information can be exchanged among the plurality of electronic devices through a plurality of communication links between the electronic devices, at least one of the electronic devices being configurable for communicating with a data source, a method for presenting a multi-channel message originating from the data source, the multi-channel message comprising a plurality of components, the method comprising the steps of:

allocating each of at least a portion of the plurality of components in the multi-channel message to at least one electronic device for presentation to a user;

for each allocated component, determining possible communication paths between the data source and the at least one electronic device allocated to the corresponding component;

selecting, based at least in part on one or more selection criteria, at least one of the possible communication paths for each of the allocated components, each of the selected communication paths representing an optimal route between the data source and the at least one electronic device allocated to the corresponding component; and routing each of the allocated components in the multi-channel message according to the selected communication paths for presentation of the allocated components by the corresponding electronic devices.

2. The method of claim 1, wherein the step of determining possible communication paths comprises the steps of:

designating one of the communication links as an input communication link over which to receive the multi-channel message from the data source;

designating one of the electronic devices as a destination device for presenting one of the components in the multi-channel message;

evaluating whether a communication path exists between a first electronic device, the first electronic device being connected to the input communication link, and a second electronic device;

when a communication path exists between the first and second electronic devices, determining substantially all possible communication paths between the second electronic device and the destination device not including the first electronic device; and repeating the steps of evaluating whether a communication path exists and determining possible communication paths for each of the electronic devices in the connection arrangement except for the first electronic device, wherein another one of the electronic devices that has not been evaluated is substituted for the second device.

3. The method of claim 2, wherein the step of determining the communication paths further comprises associating an indication with each of the possible communication paths.

4. The method of claim 3, wherein the indication associated with a given one of the communication paths represents at least one of: (i) each of the electronic devices comprising the given communication path; and (ii) each of at least one intervening communication link comprising the given communication path.

5. The method of claim 2, wherein the step of determining the communication paths further comprises generating an output list comprising substantially all possible communication paths between each electronic device and the destination device, not including the first electronic device.

6. The method of claim 1, wherein the step of selecting the communication paths for the allocated components comprises:

for each allocated component in the multi-channel message, determining a latency associated with each of the possible communication paths in the connection arrangement corresponding to the allocated components; and selecting communication paths for the allocated components such that the latencies associated with each of the selected communication paths are substantially matched to one another.

7. The method of claim 1, further comprising the step of at least temporarily storing information relating to the possible communication paths between the data source and the electronic devices allocated to the corresponding components in the multi-channel message.

8. The method of claim 1, wherein the step of selecting the communication paths for the allocated components comprises, for a given allocated component in the multi-channel message:

receiving a plurality of possible communication paths between the data source and the at least one electronic device corresponding to the given allocated component;

receiving at least one characteristic associated with the plurality of possible communication paths;

determining a set of aggregate attributes corresponding to each of the plurality of possible communication paths;

comparing the set of aggregate attributes for the plurality of possible communication paths; and determining, based at least in part on the at least one characteristic associated with each of the plurality of possible communication paths, an optimal communication path for the given allocated component.

9. The method of claim 8, wherein the set of aggregate attributes corresponding to a given one of the plurality of possible communication paths comprises characteristics associated with at least one communication link included in the given one of the plurality of possible communication paths.

10. The method of claim 9, wherein the characteristics associated with the at least one communication link comprises at least one of power of the at least one link, an estimate of link latency, a distribution of link latencies, an estimate of a bandwidth of the at least one link, and a number of dropped packets on the at least one link as a proportion of a number of packets sent on the at least one link.

11. The method of claim 1, wherein the data source comprises at least one of the plurality of electronic devices in the connection arrangement.

12. The method of claim 1, wherein the data source comprises the Internet.

13. The method of claim 1, wherein the selection criteria comprises latency.

14. Apparatus for presenting a multi-channel message originating from a data source, the multi-channel message comprising a plurality of components, the apparatus comprising:

at least one controller operative to: (i) allocate each of at least a portion of the plurality of components in the multi-channel message to at least one electronic device for presentation to a user; (ii) for each allocated component, determine possible communication paths between the data source and the electronic device allocated to the corresponding component; (iii) select, based at least in part on one or more selection criteria, at least one of the possible communication paths for each of the allocated components, each of the selected communication paths representing an optimal route between the data source and the at least one electronic device allocated to the corresponding component; and (iv) route each of the allocated components in the multi-channel message according to the selected communication paths for presentation of the allocated components by the corresponding electronic devices.

15. The apparatus of claim 14, wherein the controller is further operative to: (v) designate one of a plurality of communication links between a plurality of electronic devices in a connection arrangement as an input communication link over which to receive the multi-channel message from the data source; (vi) designate one of the electronic devices as a destination device for presenting one of the components in the multi-channel message; (vii) evaluate whether a communication path exists between a first electronic device, the first electronic device being connected to the input communication link, and a second electronic device; (viii) when a communication path exists between the first and second electronic devices, determine substantially all possible communication paths between the second electronic device and the destination device not including the first electronic device; and (ix) repeat the steps of evaluating whether a communication path exists and determining possible communication paths for each of the electronic devices in the connection arrangement except for the first electronic device, wherein another one of the electronic devices that has not been evaluated is substituted for the second electronic device.

16. The apparatus of claim 15, wherein the controller is further operative to associate an indication with each of the possible communication paths.

17. The apparatus of claim 15, wherein the controller is further operative to generate an output list comprising substantially all possible communication paths between each electronic device and the destination device, not including the first electronic device.

18. The apparatus of claim 14, wherein the controller is further operative to: (v) determine a latency associated with each of the possible communication paths in the connection arrangement corresponding to the allocated components; and (vi) select communication paths for the allocated components such that the latencies associated with each of the selected communication paths are substantially matched to one another.

19. The apparatus of claim 14, wherein, for a given allocated component in the multi-channel message, the controller is further operative to: (v) receive a plurality of possible communication paths between the data source and the at least one electronic device corresponding to the given allocated component; (vi) receive at least one characteristic associated with the plurality of possible communication paths; (vii) determine a set of aggregate attributes corresponding to each of the plurality of possible communication paths; (viii) compare the set of aggregate attributes for the plurality of possible communication paths; and (ix) determine, based at least in part on the at least one characteristic associated with each of the plurality of possible communication paths, an optimal communication path for the given allocated component.

20. The apparatus of claim 19, wherein the set of aggregate attributes corresponding to a given one of the plurality of possible communication paths comprises characteristics associated with at least one communication link included in the given one of the plurality of possible communication paths.

21. The apparatus of claim 14, wherein the apparatus is implemented at least in part in a semiconductor device.

22. An article of manufacture for presenting a multi-channel message originating from a data source, the multi-channel message comprising a plurality of components, the article of manufacture comprising a machine readable medium containing one or more programs which when executed implement the steps of:

allocating each of at least a portion of the plurality of components in the multi-channel message to at least one electronic device for presentation to a user;

for each allocated component, determining possible communication paths between the data source and the at least one electronic device allocated to the corresponding component;

selecting, based at least in part on one or more selection criteria, at least one of the possible communication paths for each of the allocated components, each of the selected communication paths representing an optimal route between the data source and the at least one electronic device allocated to the corresponding component; and routing each of the allocated components in the multi-channel message according to the selected communication paths for presentation of the allocated components by the corresponding electronic devices.

* * * * *